United States Patent [19]

Tanaka

[11] Patent Number: 5,222,056
[45] Date of Patent: Jun. 22, 1993

[54] OPTICAL PICKUP APPARATUS HAVING A COMPACT STRUCTURE

[75] Inventor: Akihiro Tanaka, Tokyo, Japan

[73] Assignee: Asahi Kogaku Kogyo K.K., Tokyo, Japan

[21] Appl. No.: 494,359

[22] Filed: Mar. 16, 1990

[30] Foreign Application Priority Data

Mar. 30, 1989 [JP] Japan ................... 1-81017

[51] Int. Cl.⁵ ............................................. G11B 7/00
[52] U.S. Cl. ........................... 369/44.22; 369/44.15; 359/813; 359/823
[58] Field of Search ............. 369/44.15, 44.16, 44.17, 369/44.21, 44.11; 359/811, 813, 819, 823, 822, 824

[56] References Cited

U.S. PATENT DOCUMENTS

| | | |
|---|---|---|
| 4,592,037 | 5/1986 | Ohnuki . |
| 4,596,448 | 6/1986 | Kikuchi ..................... 359/823 X |
| 4,613,202 | 9/1986 | Kuriyama ..................... 369/44.15 |
| 4,646,283 | 2/1987 | Ito et al. ..................... 369/44.15 |
| 4,752,117 | 6/1988 | Ichikawa et al. ............... 359/824 X |
| 4,891,799 | 1/1990 | Nakano ..................... 369/44.16 |
| 4,991,161 | 2/1991 | Ikegame et al. ................. 369/44.16 |
| 5,022,022 | 6/1991 | Kikuchi et al. .................. 369/44.16 |

FOREIGN PATENT DOCUMENTS

| | | |
|---|---|---|
| 60-22743 | 2/1985 | Japan . |
| 60-22744 | 2/1985 | Japan . |
| 0059636 | 3/1986 | Japan .............................. 369/44.22 |
| 61-82337 | 4/1986 | Japan . |
| 61-82338 | 4/1986 | Japan . |
| 61-82339 | 4/1986 | Japan . |
| 61-82340 | 4/1986 | Japan . |
| 61-18261 | 5/1986 | Japan . |
| 0033344 | 2/1987 | Japan .............................. 369/44.16 |
| 0263638 | 10/1988 | Japan .............................. 369/44.15 |

Primary Examiner—Aristotelis Psitos
Assistant Examiner—Thang V. Tran
Attorney, Agent, or Firm—Sughrue, Mion, Zinn, Macpeak & Seas

[57] ABSTRACT

An optical pickup apparatus includes a lens holder, a focusing coil mounted on the lens holder and passing through a gap between first and second yoke portions, and a tracking coil mounted on the lens holder in such a manner that it does not pass through the gap but passes adjacent a third yoke portion.

7 Claims, 6 Drawing Sheets

OPTICAL PICKUP APPARATUS HAVING A COMPACT STRUCTURE

BACKGROUND OF THE INVENTION

The present invention relates to an optical pickup apparatus suitable for use with optical video disk players, compact disk players, optical disk systems, magnetooptical recording and reproducing apparatus, etc.

In reproducing recorded information from the disk of an optical video disk player, laser light emitted from a light source such as a semiconductor laser is focused at a point on the disk and the light reflected from the illuminated disk is picked up. The reflected light is modulated by the information recorded on the disk, so that by performing photoelectric conversion on this light, an electric signal corresponding to the recorded information can be obtained.

For correct reproduction of the recorded information from the disk, it is necessary that light be not only focused on the surface of the disk where information is recorded but also caused to closely follow the track on which the information of interest is recorded. To meet this need, an optical pickup apparatus is equipped with a mechanism by which the objective lens for converging light onto the disk is driven both in a direction perpendicular to the disk (focusing direction) and in a radial direction (tracking direction). While this drive mechanism is available in various designs, the usual type is such that a magnet is combined with a yoke to form a closed magnetic circuit, with a tracking and a focusing coil being placed within the magnetic field of the magnetic circuit and supplied with associated error signals.

In the prior art optical pickup apparatus, the tracking and focusing coils are wound one on top of another so that both are driven by a common magnetic circuit. Thus, in order to ensure that the tracking coil will not contact either the top or bottom surface of the yoke during driving in a focusing direction, the distance between the tracking coil and the yoke must be made adequately large in the focusing direction, but then the apparatus will increase in size, particularly in height, or thickness.

SUMMARY OF THE INVENTION

The present invention has been accomplished under these circumstances, and its principal object is to provide an optical pickup apparatus that is reduced in size, particularly in thickness.

This object of the present invention can be attained by an optical pickup apparatus comprising: a lens for focusing light to illuminate a selected area of a recording medium for information recording or reproduction; a holder for retaining the lens; a support member for supporting the holder in such a way that it is movable both in a direction parallel to the optical axis of the lens and in a direction perpendicular to it; a magnet for generating a magnetic flux; a first coil wound onto the holder in a direction perpendicular to the optical axis of the lens in such a way that it traverses the magnetic flux generated by the magnet; a yoke positioned to face the magnet, with the first coil being interposed, in such a way that the magnetic flux traversing the first coil is caused to travel in a circular path; and a second coil that is wound onto the holder in a direction parallel to the optical axis of the lens in such a way as to traverse the magnetic flux generated by the magnet and that is positioned outside the yoke.

DETAILED DESCRIPTION OF THE PREFERRED EMBODIMENTS

In the apparatus of the present invention, the focusing first coil and the tracking second coil are mounted on the holder for typically retaining an objective lens. The magnet is provided in such a way that the magnetic flux it generates will traverse these coils, so that by supplying these coils with either a focus error signal or a tracking error signal, the holder and hence the objective lens can be driven in a focusing or tracking direction. The second coil is provided outside the yoke for causing the magnetic flux to travel in a circular path in, for example, a closed magnetic circuit. Hence, the second coil will not contact the yoke when it moves in a focusing direction, and its height can be set to a desired value irrespective of its stroke in the focusing direction. As a result, the apparatus can be reduced in size, particularly in thickness.

Figure 1:
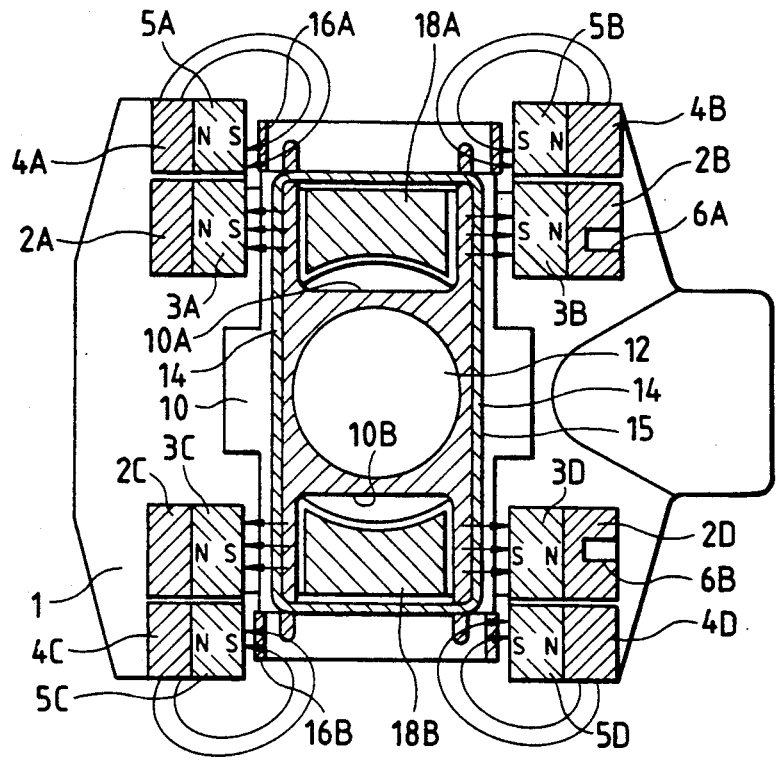
FIG. 1 is a cross section taken on line A—A of FIG. 3.
Figure 2:
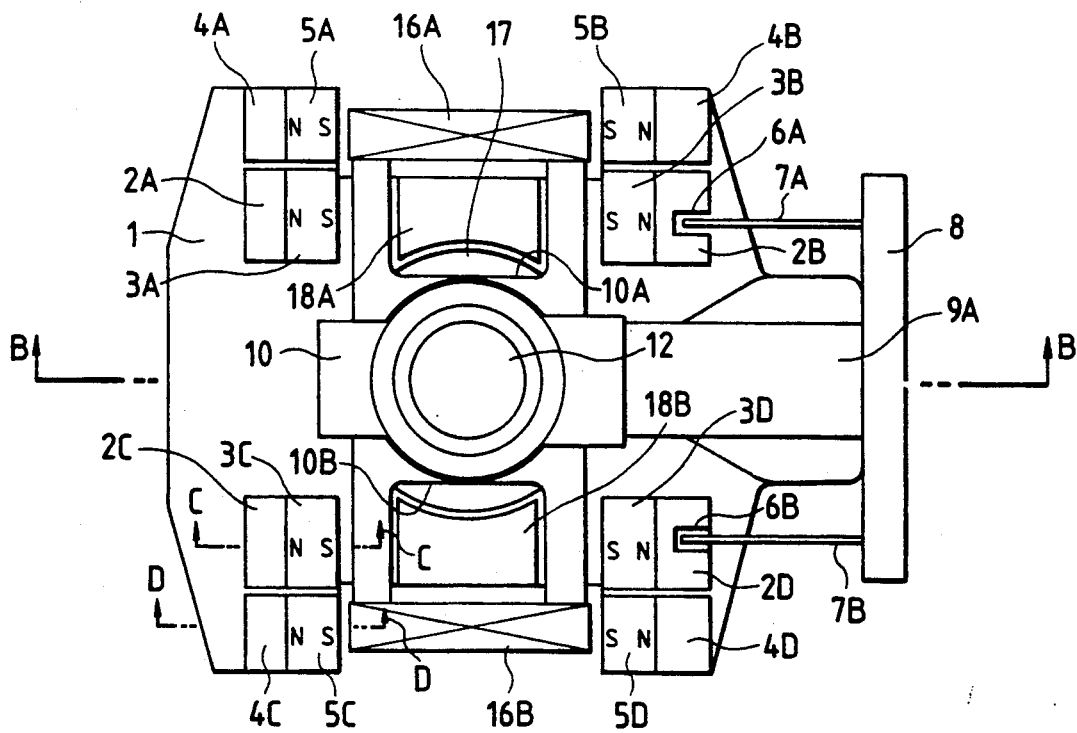
FIG. 2 is a plan view of an optical pickup apparatus according to a first embodiment of the present invention.
Figure 3:
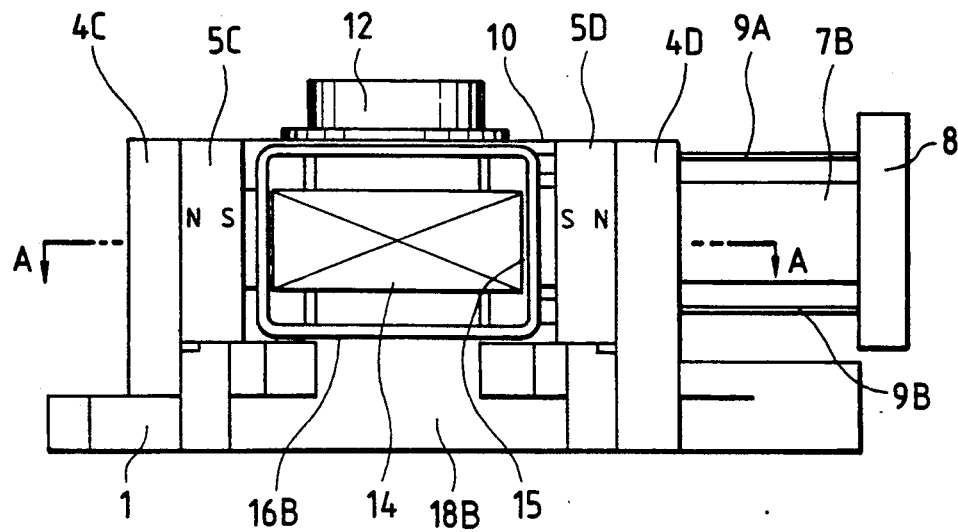
FIG. 3 is a side view of the apparatus of FIG. 2.

FIGS. 1–4 show the construction of the optical pickup apparatus of the present invention. Shown by 1 in these drawings is a horizontal yoke table having vertically erected projections 2A, 2B, 2C and 2D. Another set of vertical projections 4A to 4D are formed outwardly of these projections 2A to 2D on either side of the yoke table as seen in FIG. 2. The table 1 and projections 2A to 2D and 4A to 4D all serve as yoke components. Magnets 3A to 3D and 5A to 5D are fixed inwardly of the projections 2A to 2D and 4A to 4D, respectively. In FIGS. 1–4, the inner side of each magnet is shown to be the south pole whereas the outer side (facing a corresponding yoke component) is shown to be the north pole. Needless to say, the inner side may assume the north pole and the outer side the south pole.

Recesses 6A and 6B are formed on the front side (the right side as seen in FIG. 2) of inner projections 2B and 2D, respectively, and leaf springs 7A and 7B capable of elastic deformation in a tracking direction (the vertical direction as seen in FIG. 2) are fixed in recesses 6A and 6B, respectively. A relay member 8 is fixed at the other end of each of the leaf springs 7A and 7B.

Figure 4:
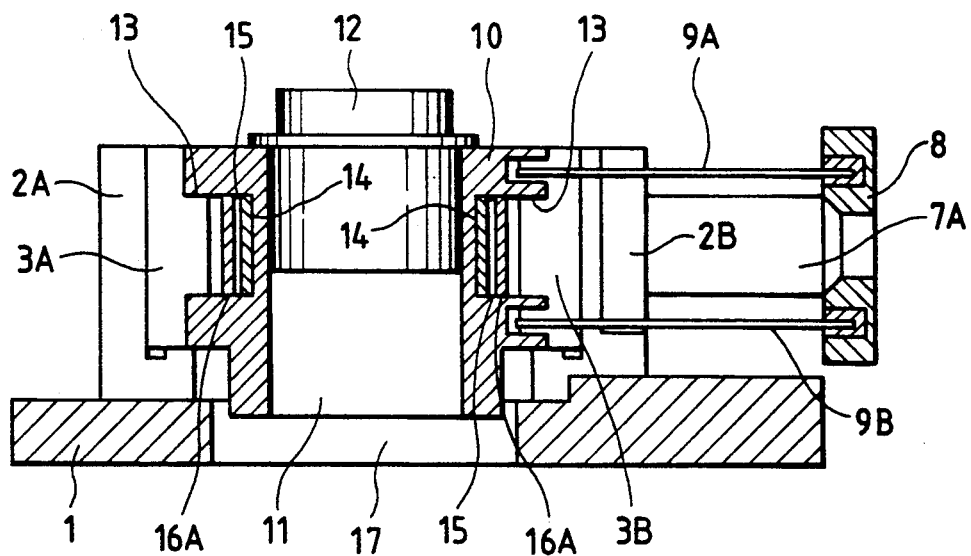
FIG. 4 is a cross section taken on line B—B of FIG. 2.
Figure 5:
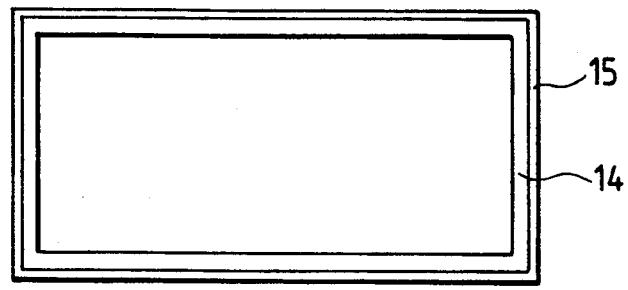
FIG. 5 is a plan view of the focusing coil used in the apparatus of the present invention.

Leaf springs 9A and 9B are fixed at one end to the relay member 8 and are capable of elastic deformation in a focusing direction (in the vertical direction as viewed in FIG. 4). The other end of each of the leaf springs 9A and 9B is attached to a holder 10 typically made of a synthetic resin. The holder 10 has a central hole 11 through which an objective lens 12 is inserted and fixed. A recess 13 is formed in the outer side wall of the holder 10, and a focusing coil 14 is mounted in this recess 13. The focusing coil 14 is wound in a plane perpendicular to the optical axis (focusing direction) of the objective lens 12. A flexible substrate 15 is fixed around the focusing coil 14 as shown specifically in FIG. 5.

Tracking coils 16A and 16B are mounted at the right and left ends (the upper and lower ends as seen in FIG. 1), respectively, of the holder 10. These tracking coils 16A and 16B are wound in a plane parallel to the optical axis of the objective lens 12. A hole 17 is formed in the table 1, and light emitted from a light source (not shown) is launched into the objective lens 12 via holes 17 and 11 so that it is focused on a selected area of a disk (not shown) serving as a recording medium. Projections 18A and 18B are formed as vertical extensions of the table 1 and also serve as yoke components. These projections 18A and 18B form inner yokes and are positioned in such a way that they are inserted into recesses 10A and 10B in the holder 10 which generally assumes an H shape as seen from above in FIGS. 1 and 2.

Figure 6:
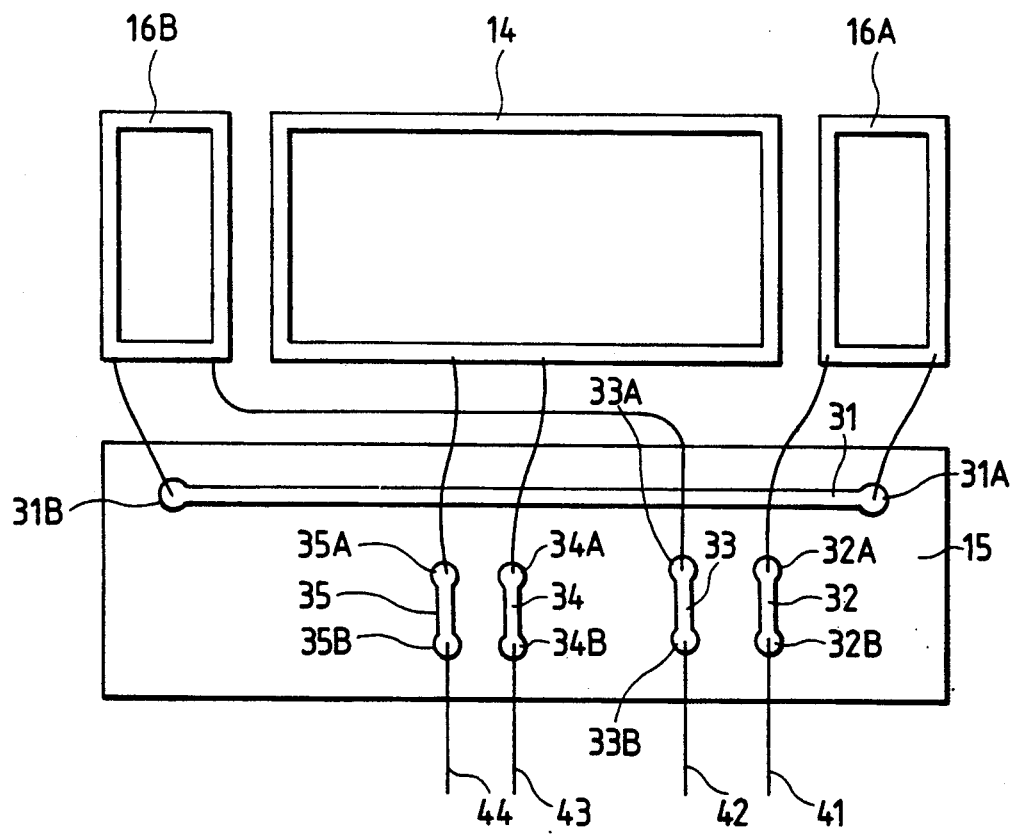
FIG. 6 illustrates how the focusing and tracking coils used in the apparatus of the present invention are energized.

FIG. 6 is a schematic representation of the wiring of signal lines over which the focusing and tracking coils are energized. Flexible substrate 15 has the following patterns formed thereon: a pattern 31 having lands 31A and 31B; a pattern 32 having lands 32A and 32B; a pattern 33 having lands 33A and 33B; a pattern 34 having lands 34A and 34B; and a pattern 35 having lands 35A and 35B. One end (e.g., the positive side) of the tracking coil 16A and the other end (e.g., the negative side) of the coil are connected to lands 31A and 32A, respectively. One end (the positive side) of the other tracking coil 16B and the other end (the negative side) of the coil are connected to lands 33A and 31B, respectively. One end (the positive side) of the focusing coil 14 and the other end (the negative side) of the coil are connected to lands 34A and 35A, respectively. Lands 32B, 33B, 34B and 35B are connected to terminals (not shown) of the relay member 8 via leads 41, 42, 43 and 44, respectively. The wiring circuit described above allows a predetermined drive signal to be supplied in series to tracking coils 16A and 16B through a loop consisting of lead 42, pattern 33, tracking coil 16B, pattern 31, tracking coil 16A, pattern 32, and lead 41. In a similar way, another predetermined drive signal code can be supplied to the focusing coil 14 through a loop consisting of lead 43, pattern 34, focusing coil 14, pattern 35, and lead 35.

Figure 7:
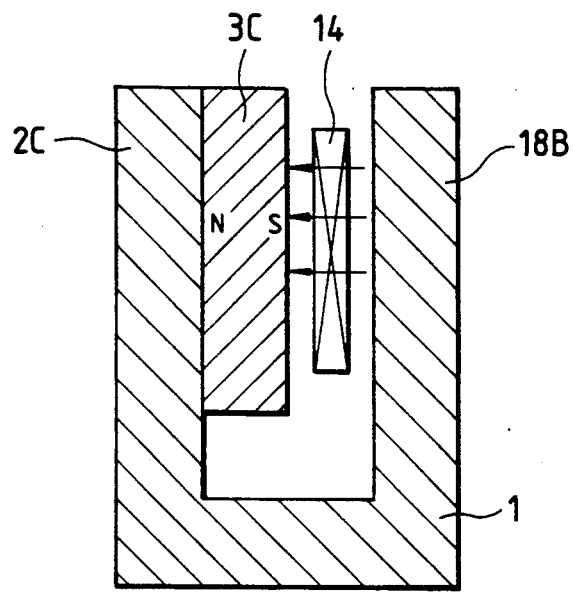
FIG. 7 is a schematic cross section taken on line C—C of FIG. 2.

A focusing magnetic circuit may be configured as shown in FIG. 7. The circuit shown in FIG. 7 is a closed loop/wherein the magnetic flux emerging from the north pole of magnet 3C passes through the projection 2C, table 1 and projection 18B, which serve as yoke components, to enter at the south pole of magnet 3C. Since the focusing coil 14 is disposed between the projection 18B and magnet 3C, it is driven in the focusing direction when energized. The same applies to the focusing magnetic circuits provided around the other three magnets 3A, 3B and 3D.

When a force for driving the focusing coil 14 is generated, the holder 10 to which the focusing coil 14 is fixed, and hence the objective lens 12, is driven in the focusing direction. As a result, leaf springs 9A and 9B deform elastically in the focusing direction with the relay member 8 serving as the fulcrum, and this causes a translational movement of the objective lens 12 in the focusing direction.

Leaf springs 9A and 9B are fixed at one end to the relay member 8 which in turn is fixed to projections 2B and 2D via leaf springs 7A and 7B. These leaf springs 7A and 7B are incapable of elastic deformation in the focusing direction. Hence, the relay member 8 will be held stationary when the objective lens 12 makes a translational movement in the focusing direction.

As shown in FIGS. 1 and 2, tracking coils 16A and 16B are positioned outwardly of projections 18A and 18B (inner yokes) on either side thereof. Thus, these tracking coils will not contact the upper or lower surface of either projection 18A or 18B when the holder 10 moves in the focusing direction.

Figure 8:
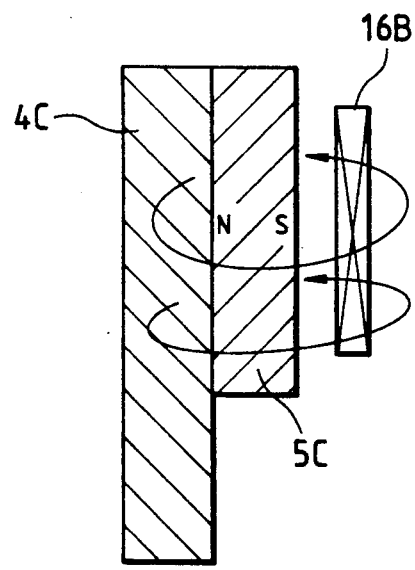
FIG. 8 is a schematic cross section taken on line D—D of FIG. 2.

A tracking magnetic circuit may be configured as shown in FIG. 8, where the magnetic flux emerging from the north pole of magnet 5C enters projection 4C (yoke member), thence emerges from its rear or lateral side, and passes through the air to enter at the south pole of magnet 5C. In other words, the tracking magnetic circuit has larger reluctance than that of the focusing magnetic circuit of FIG. 7. Nevertheless, tracking coil 16B is located close to the south pole of magnet 5C, so that a necessary amount of magnetic flux generated by the magnet 5C will traverse this tracking coil. Hence, the tracking coil 16B, when energized, will generate a drive force in the tracking direction. The same applies to the tracking magnetic circuits provided around the other three magnets 5A, 5B and 5D.

Leaf springs 9A and 9B are incapable of elastic deformation in the tracking direction. Hence, upon energization of tracking coils 16A and 16B, leaf springs 7A and 7B deform elastically in the tracking direction with the fulcrum being the points where they are attached to projections 2B and 2D. As a result, the holder 10 to which the objective lens 12 is fixed, leaf springs 9A and 9B, and the relay member 8 will altogether make a translational movement in the tracking direction.

Tracking coils 16A and 16B, as well as focusing coil 14 are positioned in such a way that part of each coil is located outwardly of projections 18A and 18B. Hence, when the holder 10 moves rightward (upward as viewed in FIG. 1), the end of the inner side of the tracking coil 16B or the left end of the inner side of the focusing coil 14 may contact the end of the outer side of the projection 18B. Similarly, when the holder 10 moves leftward (downward as viewed in FIG. 1), the end of the inner side of the tracking coil 16A or the right end of the inner side of the focusing coil 14 may contact the end of the outer side of the projection 18A. To eliminate these possibilities, the distance between the tracking coil 16B or focusing coil 14 and the projection 16B as well as the distance between the tracking coil 16A or focusing coil 14 and the projection 18A should be determined in consideration of the stroke necessary for tracking purposes.

Figure 9:
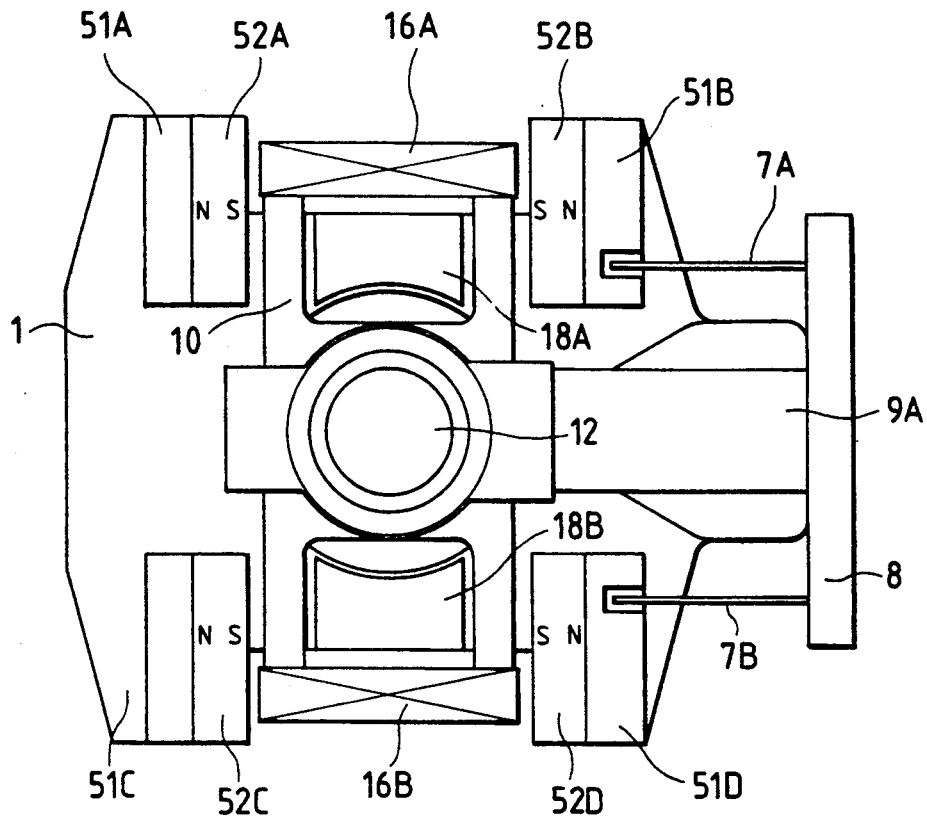
FIG. 9 is a plan view of an optical pickup apparatus according to a second embodiment of the present invention.
Figure 10:
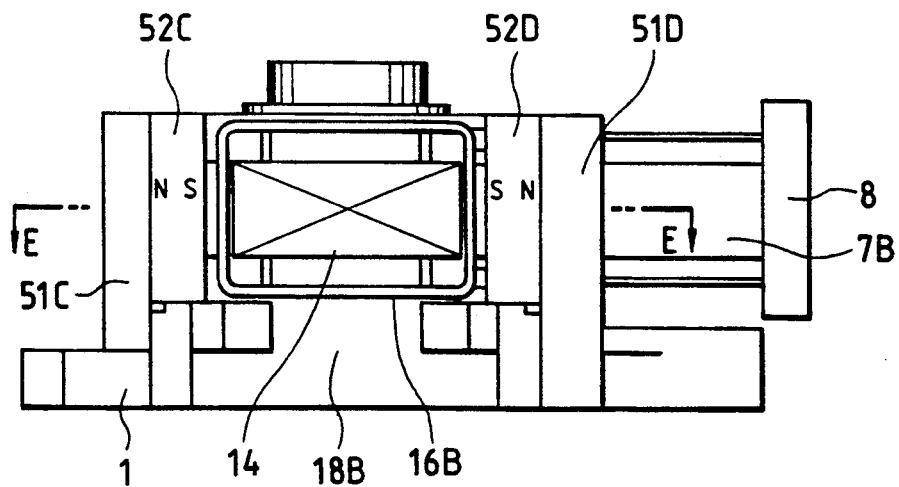
FIG. 10 is a side view of the apparatus of FIG. 9.
Figure 11:
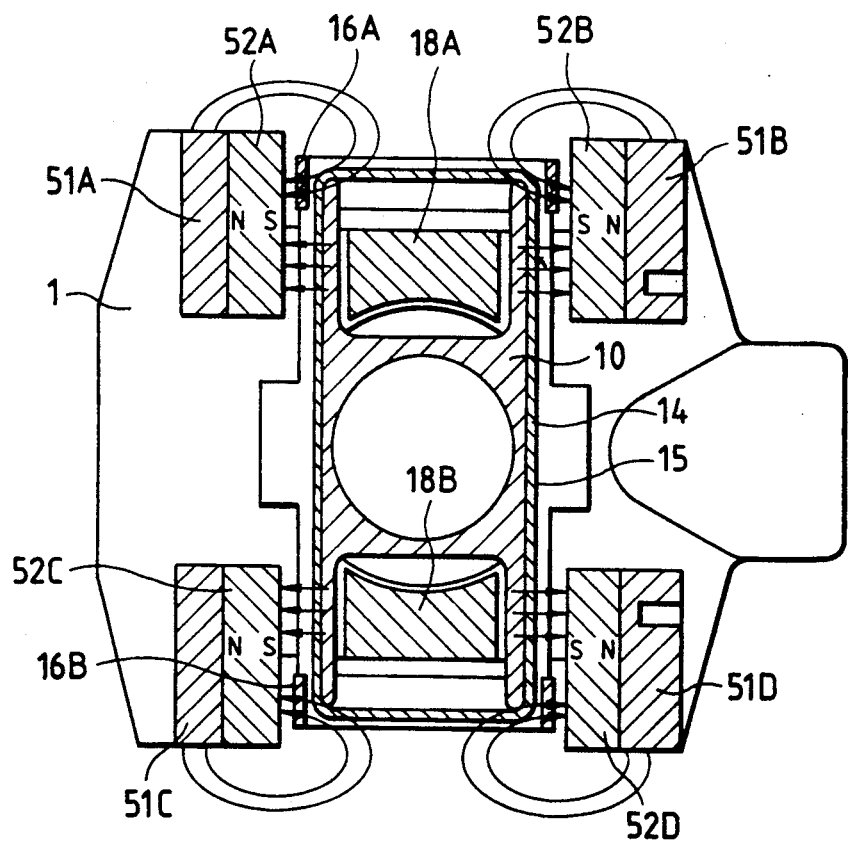
FIG. 11 is a cross section taken on line E—E of FIG. 10.

FIGS. 9-11 show a second embodiment of the present invention. In the first embodiment, two separate sets of the magnet and yoke, e.g., 2A/3A and 4A/5A, are provided, one set for focusing purposes and the other set for tracking purposes. In the second embodiment, those two sets are combined to form a single set of a magnet and yoke. As shown, projections 51A to 51D are provided as yoke components and magnets 52A to 52D are mounted in association with these projections. In other words, the inner half of each of the magnets 52A to 52D is used for the focusing purpose and the outer half used for the tracking purpose. This arrangement is effective in causing the pickup system to operate in the same way as in the first embodiment.

Another feature of the second embodiment is that in order to insure a longer tracking stroke, the distance from the end face of the outer side of each of projections 18A and 18B to the end face of focusing coil 14 in the tracking direction is set to be longer than in the first embodiment. This is achieved by placing the tracking coils 16A and 16B in partial superposition on the focusing coil 14 without causing any substantial problems in actual operations.

In the meantime, in conjunction with the second embodiment, Japanese Patent Application Examined Publication No. 18261/1986 is noted here which discloses arranging a focusing coil and a tracking coil to form a region in which the two coils orthogonally cross each other and applying a common magnetic flux to the focusing and tracking coils in this crossing region. An objective lens is moved two-dimensionally by utilizing orthogonal forces acting on the focusing and tracking coils in the crossing region.

In the second embodiment of the invention, part of the focusing coil 14 crosses the tracking coil 16A or 16B at its right or left side, and a common magnetic flux intersects the focusing and tracking coils in these crossing regions. However, since only small part of the focusing coil 14 is located in the crossing region, the common magnetic flux has a very limited role in producing the force of moving the objective lens 12 in the focusing direction. In other words, the focusing control force is mainly produced by a magnetic flux which intersects the rest of the focusing coil 14 that is not located in the crossing region. Furthermore, it is apparent that a magnetic flux other than the common magnetic flux has no effect in producing the force of moving the objective lens 12 in the tracking direction. The inventor confirmed these facts by conducting an experiment in which each of the magnets 52A to 52D was separated into the outer half and inner half and effects of each half magnet on the focusing control and the tracking control were examined. As a consequence, it can be said that in the second embodiment the magnetic flux for the focusing control and that for the tracking control are substantially independent of each other, and hence that the second embodiment is apart from the disclosure of the above Japanese patent publication.

As described above, the tracking coils used in the optical pickup apparatus of the present invention are positioned outwardly of projections serving as inner yokes. This arrangement ensures that the tracking coils will not contact the upper or lower surface of either projection when they are driven in a focusing direction, thereby contributing to a reduction in the size, particularly in the thickness, of the apparatus.

What is claimed is:

1. An optical pickup apparatus comprising:
   a lens for focusing light to illuminate a selected area of a recording medium;
   a holder for retaining said lens;
   a support member for supporting said holder in such a way that said holder is movable both in a focusing direction parallel to the optical axis of said lens and in a tracking direction perpendicular to said optical axis;
   a magnet for generating a magnetic flux;
   a first coil (14) wound onto said holder so as to surround said optical axis, said first coil traversing the magnetic flux generated by said magnet;
   a yoke having a first portion (18A) positioned to face said magnet across a gap, with said first coil passing through said gap; and
   a second coil (16) wound onto said holder and surrounding an axis substantially parallel to said tracking direction, said second coil traversing the magnetic flux generated by said magnet but being positioned outside of said gap wherein said first and second coils are successively arranged in said tracking direction and wherein said yoke includes a second portion (2A) disposed on a side of said magnet opposite said gap and a third portion disposed adjacent said magnet on a side opposite said second coil but does not include any portion adjacent said second coil on a side opposite said third portion.

2. An optical pickup apparatus according to claim 1, wherein said yoke includes a further portion connecting said first and second portions, with said first, second and further portions forming a magnetic circuit for flux from said magnet.

3. An optical pickup apparatus, according to claim 1, wherein said second and third yoke portions have a gap therebetween.

4. An optical pickup apparatus according to claim 1, wherein said magnet includes a first magnet portion disposed between said first and second yoke portions, and a second magnet portion separated from said first magnet portion and opposite said third yoke portion.

5. An optical pick-up apparatus according to claim 1, wherein said first and second coils overlap one another in the direction of said optical axis.

6. An optical pick-up apparatus according to claim 1 wherein said second coil includes two coils and wherein said first coil is disposed between said two coils without any overlap therebetween.

7. An optical pickup apparatus comprising:
   a leans for focusing light to illuminate a selected area of a recording medium;
   a holder for retaining said lens;
   a magnetic for simultaneously generating a magnetic flux for moving said holder, and attendantly said lens, in a focusing direction and a tracking direction;
   a first coil connected to said holder and arranged so as to traverse said magnetic flux, for moving said lens in a focusing direction when activated;
   a yoke including a first portion to which said magnet is secured, a second portion opposing said first portion across a gap and a third portion interconnecting said first and second portions such that magnetic flux generated by said magnet passes across said gap, said first coil passing through said gap; and
   a second coil connected to said holder and arranged so as to traverse said magnetic flux but to be positioned outside of at least said first and third portions, for moving said lens in a tracking direction when activated; wherein
   a part of said magnetic flux for a focusing control is substantially independent of another part of said magnetic flux for a tracking control and wherein the positioning of said second coil outside of at least said first and third portions allows said holder to move in said focusing direction without said second coil abutting against said yoke.

* * * * *